United States Patent [19]

Peterson

[11] 4,188,729
[45] Feb. 19, 1980

[54] SCRIBING PROTRACTOR

[76] Inventor: Edwin E. Peterson, 4109 Chenowith, Box D 19, The Dalles, Oreg. 97058

[21] Appl. No.: 962,083

[22] Filed: Nov. 20, 1978

[51] Int. Cl.² .............................................. C01B 19/62
[52] U.S. Cl. ........................................ 33/332; 33/391
[58] Field of Search .......................... 33/332, 344, 391

[56] References Cited
U.S. PATENT DOCUMENTS

| 1,618,262 | 2/1927 | Barger | 33/391 |
| 1,814,976 | 7/1931 | Stromer | 33/391 |
| 2,822,623 | 2/1958 | Legois | 33/332 |

Primary Examiner—Charles E. Phillips
Attorney, Agent, or Firm—Eugene D. Farley

[57] ABSTRACT

A scribing protractor comprises a dial calibrated in selected units of angular measurement and plumb needle means pivotally mounted overlying the dial for determining the angle with reference to the vertical of a surface to be measured. Scribing means are provided on the assembly for marking the position of the protractor at the angle location.

3 Claims, 9 Drawing Figures

U.S. Patent
Feb. 19, 1980
4,188,729
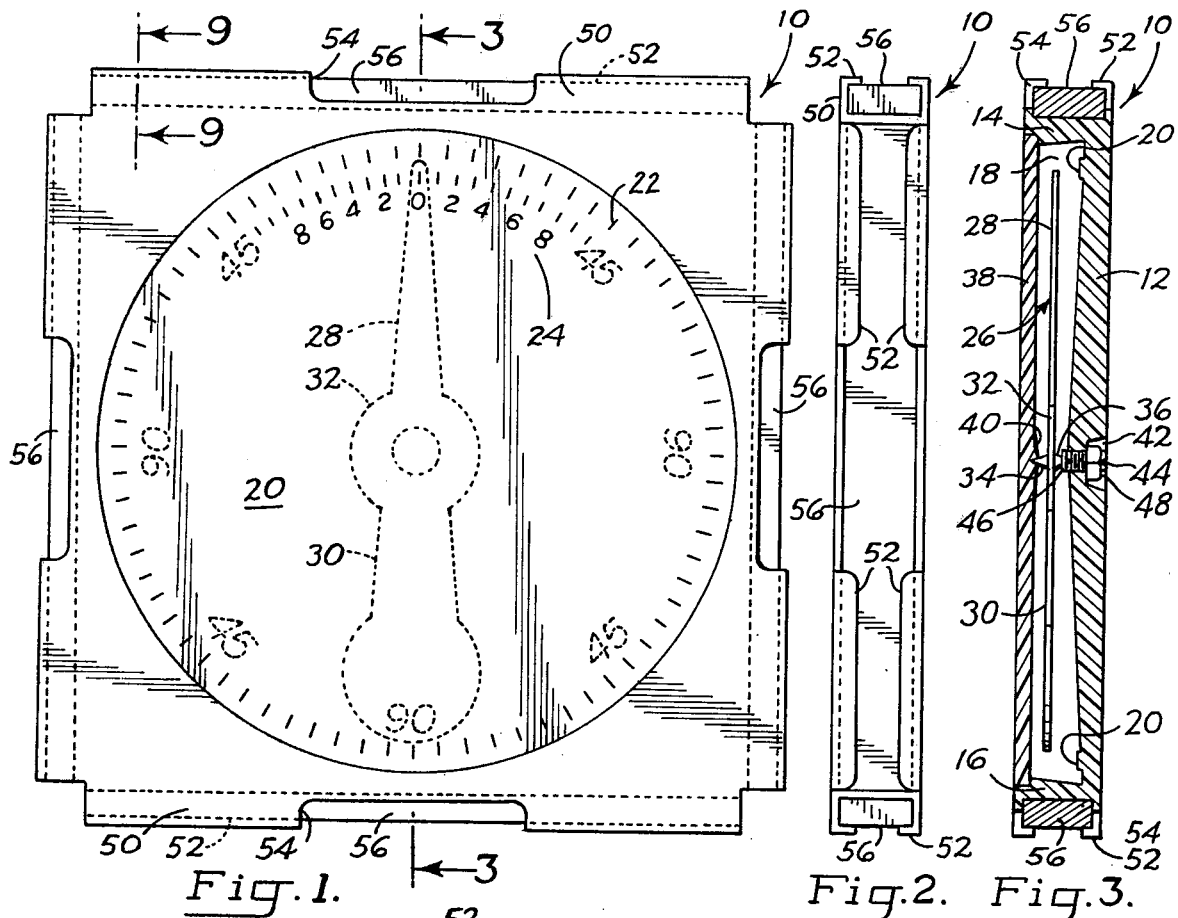
Fig.1. Fig.2. Fig.3.
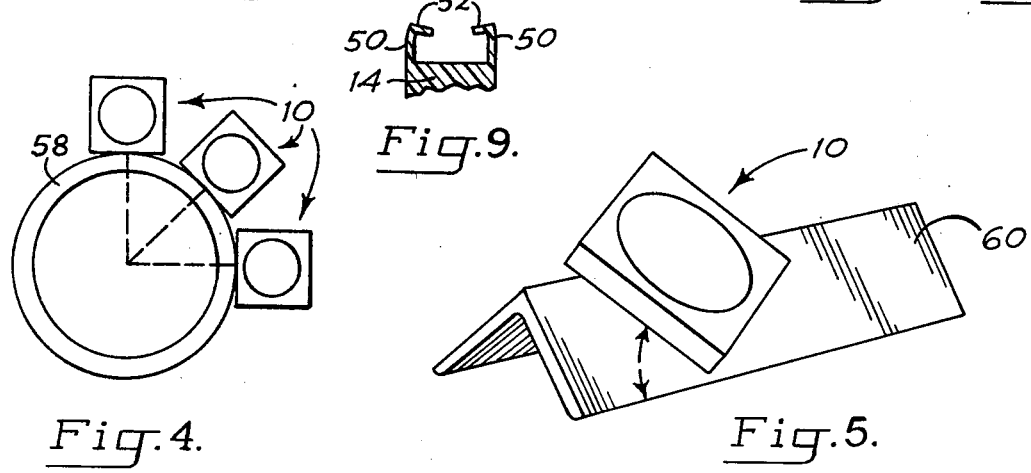
Fig.9.
Fig.4. Fig.5.
Fig.6. Fig.7. Fig.8.

SCRIBING PROTRACTOR

BACKGROUND AND GENERAL STATEMENT OF THE INVENTION

This invention pertains to protractors. It pertains particularly to scribing protractors of the class used for determining the angle with reference to the vertical of a surface to be measured, and for marking the location of the angle on the surface.

In the welding, carpentry and metal working trades there are many situations in which it is necessary to secure an accurate angular measurement of difficult surfaces.

Thus in the welding trade it frequently is necessary to measure angles on the exterior surface of a pipe in order to join the ends of two pipes together, or to splice the end of a second pipe in a selected position on the surface of a first pipe.

In the metal working trades it is frequently necessary to lay out an angle on the surface of angle iron, bar stock or plate.

In the carpenter's trade it frequently is required to determine the angle of horizontal, vertical and angular surfaces.

Prior art patents addressed to the problem of providing a protractor suitable for use in such situations include the following:

| U.S. Pat. No. | Inventor | Title |
| --- | --- | --- |
| 279,336 | Clark, W. H. | Apparatus for Marking Angular Cuts in Sheet Metal Pipes |
| 1,318,607 | Schreiber, C. | Protractor |
| 2,729,891 | Winter, C. C. | Compass Instrument for Measuring and Marking Uneven Surfaces |

None of the above patents, nor any patent, publication or prior art device known to me, provides a protractor of simple and durable construction, which is useful in a wide variety of angle-measuring situations, which is easily used with a minimum of training and experience, which may be used to determine angles quickly and with a high degree of accuracy, and which is provided with integral means for marking the angle so determined.

It is the general purpose of the present invention to provide such a protractor.

This purpose is accomplished by the provision of a protractor which, broadly considered, comprises a case having a base adapted to be placed in contact with a surface to be measured, a dial calibrated in selected units of angular measurement mounted in the case, and plumb or counterweighted needle means pivotally mounted in the case overlying the dial for determining the angle of the surface to be measured with reference to the vertical. Scribing means are mounted on the case for marking the position of case contact with the surface to be measured after the case has been adjusted to give the desired reading of angular measurement on the dial.

DESCRIPTION OF SPECIFIC EMBODIMENTS OF THE INVENTION

In the drawings:

FIG. 1 is a plan view of the scribing protractor of my invention;

FIG. 2 is a side elevation of the protractor;

FIG. 3 is a sectional view of the protractor taken along line 3—3 of FIG. 1;

FIGS. 4, 5, 6, 7 and 8 are schematic views illustrating the use of the protractor, and FIG. 9 is a fragmentary, detail, sectional view taken along line 9—9 of FIG. 1.

As shown particularly in FIGS. 1, 2 and 3, the scribing protractor of my invention, indicated generally at 10, is mounted in a case having a back wall 12, a top wall 14, a bottom wall or base 16 and a pair of end walls, one of which is seen at 18 of FIG. 3.

The case may be made of any suitable structural material such as metal or wood. Preferably, however, it comprises an integral piece of molded plastic.

For reading or determining the measured angle, there is provided a dial or face 20. This may be painted on the front surface of back wall 12. Alternatively it may be printed on a separate piece of plastic or paper which then is glued to the back wall.

The face of dial 20 is calibrated in the selected units of angular measurement. In the illustrated form of the invention the face of the dial is calibrated in an outer circle 22 in degrees and in an inner circle 24 in inches of rise per lineal foot of structural member.

To measure the angle on the dial, there is provided an indicator termed herein "plumb needle means", or "counterweighted needle means".

This member of the assembly comprises a needle indicated generally at 26. The needle consists of three principal parts: A needle or indicator segment 28, a counterweighted shank 30 and a central segment 32. The counterweighted shank portion of the needle is relatively heavy with respect to the needle portion thereof.

Pivotal mounting means is provided for pivotally mounting needle 26.

To this end the central portion of the needle is provided with an axle which may comprise a single element penetrating the central portion 32 of the needle, or a pair of axle segments aligned with each other and extending outwardly on both sides of the needle. In either event, the axle is provided with an outwardly extending segment 34 and an inwardly extending segment 36.

The respective axle segments are received in suitable bearings.

A cover plate 38 comprising a sheet of glass or clear plastic is received in an inner marginal groove in the top, bottom and end walls of the case and is anchored in place by suitable means, as by means of a suitable adhesive, or by means of bolts or screws.

The inner central portion of the cover plate is formed with a boss provided with a bearing 40 which receives axle segment 34 in bearing relationship.

The back wall 12 of the protractor case is thickened in its central portion and is provided with a stepped recess 42.

The inner segment of the stepped recess is of reduced diameter and internally threaded. It receives a screw 44 the inner end of which is provided with a bearing 46. This bearing in turn receives the inwardly directed segment 36 of the pointed axle.

The arrangement thus described provides damping means for damping the motion of the dial. This is accomplished merely by tightening down screw 44 until the dial has the desired rapidity of swinging movement. The screw then is locked in position by means of a lock nut 48.

Scribing means are provided integrally with the protractor case for the purpose of marking the desired angular measurement on the work.

To this end there are provided on the case four longitudinally discontinuous and cut-away sleeves.

As shown in FIGS. 1, 2, 3 and 9, each sleeve comprises a pair of outwardly projecting side walls 50 having inwardly turned margins forming spaced apart longitudinal flanges 52. These are made of resilient material and are angled inwardly slightly as appears particularly in FIG. 9.

The central portion of side walls 50 forming the sleeves is cut away to form an opening 54.

The sleeve forms a housing for the selected marking means 56, which may be crayon, chalk, metallic lead, or, where the protractor is to be used by welders on metal work, a piece of soapstone. This manner of mounting the marking element holds the latter securely in place, but makes possible its removal for easy replacement when damaged or broken. It also makes possible shifting the marking element longitudinally as required to present a fresh marking surface to the work.

OPERATION

The manner of use of the scribing protractor of my invention is variable depending upon its application. In general, however, it is placed on the work and its position adjusted until the plumb needle member 26 attains a desired reading on dial 20. This adjustment may be made provided the protractor is not completely horizontal. As long as it has a vertical component of position, the counterweighted needle will assume its reference position, which is the same as its vertical position, so that a dial reading of angular measurement can be obtained.

The work then is marked at this position of the protractor, thereby indicating the angular measurement on the work.

Where the work comprises a pipe to be welded, as shown in FIG. 4, several situations present themselves.

If it is desired to locate the exact top of the pipe 58, the protractor is located with its base on the pipe and shifted in position until the indicator reads zero. Merely rubbing the protractor base on the pipe then will make a soapstone or chalk mark on the exact top surface of the pipe. If 45° or 90° measurements are to be made on the pipe, the protractor is adjusted to its 45° and 90° positions and similar marks made.

If a branch pipe is to be spliced to the pipe at 45°, the 45° position is located with the protractor, and a mark made on the pipe before removing it from the pipe surface. With a compass, the pattern of the pipe to be spliced is traced, after which the desired torch cut is made.

If a longitudinal section is to be cut out of the pipe, for example at 0° and 45°, corresponding pairs of marks are made at a spaced longitudinal interval, the spaced points connected by lines, and the pipe cut away by the torch. With suitable variations of procedure, the protractor thus is applicable to almost any of the angle-measuring situations which the welder needs in the practice of his trade.

The protractor also is applicable for use in the metal working trades.

Thus, as shown in FIG. 5, if it is desired to lay out an angle on an stock employed in metal working, such as angle iron 60, the metal worker lays the protractor on the work and adjusts its position until the desired reading is obtained on dial 20. This is possible even when the protractor is laid flatwise on the work, as illustrated in FIG. 5, as long as the position of the protractor has a vertical component. When the protractor is properly located, the workman uses its side edges as a straight edge to mark the angular measurement on the work.

The protractor of my invention also may be used as a carpenter's level, to determine whether a structural member is plumb, or to determine the angle of a structural member. These applications are illustrated in FIGS. 6, 7 and 8.

If, as shown in FIG. 6, it is desired to determine whether a structural member 62 is level, the base of the protractor is placed on the member and the dial read. A zero reading indicates a level condition or the structural member.

If it is desired to determine whether a structural member 64 is plumb, the side edge of the protractor is placed on the member and the dial reading taken. A reading of zero indicates a plumb condition of the structural member.

If it is desired to determine the slope or angle of a structural member 66, the base of the protractor is placed on the structural member and a reading taken. The reading will indicate the slope or angle either in degrees on scale 22 of the dial, or in inches rise per lineal foot on scale 24 of the dial.

Having thus described my invention in preferred embodiments, I claim:

1. A scribing protractor comprising:
   (a) a case having a base adapted for placement adjacent a surface to be measured,
   (b) a dial calibrated in selected units of angular measurement mounted in the case,
   (c) plumb needle means pivotally mounted in the case, overlying the dial,
   (d) the plumb needle means comprising a needle having a pointed end and a counterweighted shank end and pivotal mounting means mounting the needle to the case intermediate the ends of the needle,
   (e) a longitudinally discountinuous sleeve on the base of the case,
   (f) the sleeve being adapted to contain a piece of coloring material with the piece positioned for contact with the surface to be measured, and
   (g) the sleeve having inwardly turned margins arranged for frictional contact with the piece of coloring material for retaining the same in operative position within the sleeve.

2. A protractor comprising:
   (a) a case having a base adapted to be placed in contact with a surface to be measured,
   (b) a dial calibrated in selected units of angular measurement mounted in the case,
   (c) plumb needle means pivotally mounted in the case overlying the dial for determining the angle of the surface to be measured, and
   (d) scribing means comprising a longitudinally discontinuous sleeve secured to the case and formed with inwardly depressed margins for engaging and securing a piece of coloring material contained in the sleeve.

3. The protractor of claim 2 wherein the case is rectangular in shape and there is a scribing means sleeve on each of the four edges of the case.

* * * * *